US006169279B1

(12) United States Patent
Fujimoto et al.

(10) Patent No.: US 6,169,279 B1
(45) Date of Patent: Jan. 2, 2001

(54) IMAGE SENSOR CHIP, METHOD FOR MANUFACTURING THE SAME, AND IMAGE SENSOR THEREFOR

(75) Inventors: Hisayoshi Fujimoto; Hiroaki Masaoka, both of Kyoto (JP)

(73) Assignee: Rohm Co., Ltd., Kyoto (JP)

( * ) Notice: Under 35 U.S.C. 154(b), the term of this patent shall be extended for 0 days.

(21) Appl. No.: 09/171,243

(22) PCT Filed: Apr. 15, 1997

(86) PCT No.: PCT/JP97/01305

§ 371 Date: Oct. 14, 1998

§ 102(e) Date: Oct. 14, 1998

(87) PCT Pub. No.: WO97/39486

PCT Pub. Date: Oct. 23, 1997

(30) Foreign Application Priority Data

Apr. 15, 1996 (JP) ..................... 8-092267
Apr. 15, 1996 (JP) ..................... 8-092268
Apr. 15, 1996 (JP) ..................... 8-092269

(51) Int. Cl.[7] ..................... H01L 27/00
(52) U.S. Cl. ..................... 250/208.1; 348/302
(58) Field of Search ..................... 250/208.1, 578.1, 250/201.5, 214.1, 214 P; 348/294, 297, 302, 304, 311, 320; 257/291, 297, 298

(56) References Cited

U.S. PATENT DOCUMENTS 4,673,821 6/1987 Morita ..................... 250/578
4,886,977 * 12/1989 Gofuku et al. ..................... 250/208.1

FOREIGN PATENT DOCUMENTS 63-108808 5/1988 (JP) .
1-39880 2/1989 (JP) .
1-208974 8/1989 (JP) .
2-20065 1/1990 (JP) .
2-210950 8/1990 (JP) .
6-273602 9/1994 (JP) .
8-88807 4/1996 (JP) .

OTHER PUBLICATIONS

May 1990 Patent Abstracts of Japan vol. 014, No. 213, JP 02 047979, Feb. 1990.

* cited by examiner

*Primary Examiner*—Que T. Le
(74) *Attorney, Agent, or Firm*—Merchant & Gould P.C.

(57) ABSTRACT

An image sensor chip for use in configuring a contact-type image sensor, wherein the fabrication of a substrate on which this chip is mounted can be markedly simplified, and the pickup of noise by the analog output can be reduced. The chip is fabricated by integrating a prescribed number of photoelectric conversion elements (28) as photoreceptors, analog switches (29) connected in series to the corresponding photoelectric conversion elements (28), a switch circuit (30) for sequentially switching on the analog switches (29) in accordance with clock signals, output loads (31, 40) jointly connected in series to sets composed of the photoelectric conversion elements (28) and their respective analog switches (29), an amplification circuit (32) for amplifying the potential of the output load components on the side of the photoelectric conversion elements, and, preferably, a gain-adjusting resistor R for this operational amplifier (32). In this case, the gain-adjusting resistor (R) comprises a plurality of resistors ($Ra_1$, $Ra_2$, $Ra_3$, $Ra_4$, $Rb_1$, $Rb_2$, $Rb_3$, $Rb_4$) and Rb4 connected in series and cuttable bypass wirings (50) provided to all or some of the plurality of resistors.

9 Claims, 11 Drawing Sheets

20
21
22
23
24
25
26
27

22
VDD
GND
SI
CLK
SO
AO
28
29
Photo Tr
Analog Sw
96Bit Shift Registor
30
Chip Select
36
35
31
40
33kΩ
200pF
32
37
Ra
Rb
Ra0
Ra1
Ra2
Ra3
Ra4
Rb0
Rb1
Rb2
Rb3
Rb4
20kΩ
2kΩ
4kΩ
8kΩ
16kΩ
200kΩ
20kΩ
40kΩ
80kΩ
160kΩ
50

22
Ra
Ra0
Ra1
Ra2
Ra3
Ra4
20kΩ
2kΩ
4kΩ
8kΩ
16kΩ
Rb0
Rb1
Rb2
Rb3
Rb4
200kΩ
20kΩ
40kΩ
80kΩ
160kΩ
50
Rb
32
37
AO
33kΩ
31
35
SO
Photo Tr
Analog Sw
29
28
96Bit Shift Registor
30
Chip Select
36
VDD
GND
SI
CLK 22
Ra
Rb
Ra0
Ra1
Ra2
Ra3
Ra4
20kΩ
2kΩ
4kΩ
8kΩ
16kΩ
Rb0
Rb1
Rb2
Rb3
Rb4
200kΩ
20kΩ
40kΩ
80kΩ
160kΩ
50
32
37
AO
200pF
40
35
SO
Photo Tr
Analog Sw
28
29
30
96Bit Shift Registor
Chip Select
36
VDD
GND
SI
CLK

IMAGE SENSOR CHIP, METHOD FOR MANUFACTURING THE SAME, AND IMAGE SENSOR THEREFOR

TECHNICAL FIELD

The present invention relates to an image sensor chip, and to a manufacturing method and image sensor therefor.

BACKGROUND ART

FIG. 11 shows the general structure of a conventional image sensor 10 used in image-scanning devices or in the image read units of fax machines.

A plurality of image sensor chips 13 are secured within an area whose length corresponds to the read width on a substrate 12 disposed on the bottom surface of a case 11 made of a resin or the like. A transparent glass cover 14 is placed on the top surface of the case 11, and a rod lens array 15 for converging a contrast image, which is aligned with a read line L marked on the glass cover 14, as an erect image of the same size on the image sensor chip array is disposed between the read line L and the image sensor chips 13. A plurality of LEDs 16, which serve as light sources for illuminating a document D through the back surface of the glass cover 14, are mounted on the a substrate 17 inside the case 11.

For example, a 1728-bit photoreceptor must be provided to obtain such an image sensor in order to read an A4 document at 8 pixels per millimeter, and 18 image sensor chips 13 should be mounted on the substrate 12 in order to provide, for example, a single image sensor chip with a 96-bit photoreceptor. Here, the length of a single image sensor chip 13 is about 12 mm.

An image sensor chip 13 is fabricated by integrating a plurality of phototransistors that correspond to the photoreceptors, analog switches connected in series with each of the phototransistors, shift registers for sequentially selecting and switching on the analog switches in accordance with clock pulses, and the like. The output side of each of the analog switches is brought out to the output terminal of the chip.

An electric current corresponding to the amount of light received during a read cycle flows through each phototransistor. When such an image sensor chip is selected, the analog switches are sequentially switched on, for example, during the fall cycles of clock pulses, with the result that microcurrent analog data corresponding to the amount of light received by each phototransistor are serially outputted to the output terminal of the chip. The output terminal of the chip is connected to a load resistor on the substrate, and the potential difference at a terminal of this load resistor is amplified by an amplification circuit mounted on the substrate.

Thus, such conventional image sensors and image sensor chips mounted thereon operate on the principle that the output microcurrent from the image sensor chips flows through the load on the substrate, and the potential at the ends of this load is amplified by an amplification circuit.

A first drawback, therefore, is that the analog data signals outputted from such image sensor chips are microsignals in the form of a high-impedance output, which, basically, facilitates noise pickup and thus impairs the read performance of the image sensor. In particular, clock pulse signals of several hundred kilohertz for use in data shifting are inputted to the substrate 12 on which the image sensor chips 13 are mounted, and these clock pulse signals are thus ultimately superposed as alternating-current components on the analog data signals (as shown in FIG. 12), adversely affecting the output characteristics.

Methods commonly undertaken in order to minimize the effect of such noise involve surrounding the analog data wiring on the substrate with grounded wiring, and placing the clock signal wiring on the back side of the substrate in a position removed as far as possible from the sensor chips.

The result is that products provided with wiring patterns on both the front and back surfaces can solely be used for the substrate 12 (as is also shown in FIG. 11). This complicates the procedures involved in fabricating such products and in mounting components on them, involves forming irregularities for the components on the back surface of the substrate 12, detracts from the aesthetic appeal of the image sensor, requires more space in the width direction for installing such an image sensor, and makes it more difficult to design compact equipment containing such image sensors.

Another drawback is that the ICs, capacitors, and resistors constituting the amplification circuit; the varistors for adjusting the gain of the amplification circuit; and a plurality of other electronic components must be mounted on the substrate separately from the image sensor chips, complicating the steps involved in the manufacture of the image sensor substrate. Specifically, the various electronic component themselves are expensive, equipment is needed for mounting these electronic components on the substrate, and the varistors must be individually adjusted while the output of the amplification circuit is measured in order to adjust the gain of the amplification circuit in accordance with the specification requirements of the customer.

DISCLOSURE OF THE INVENTION

In view of the above, it is an object of the present invention to provide an image sensor chip for use in constructing a contact-type image sensor such that the substrate on which these components are mounted can be fabricated very easily, and to provide a smaller and thinner image sensor in which the substrate does not require noise prevention and in which a substrate wired on only one side can be used.

According to a first aspect of the present invention, there is provided an image sensor chip manufactured by integrating a prescribed number of photoelectric conversion elements as photoreceptors, analog switches connected in series to the corresponding photoelectric conversion elements, and a switch circuit for sequentially switching on the analog switches in accordance with clock signals; wherein this image sensor chip is characterized by further comprising output load components jointly connected in series to sets composed of the photoelectric conversion elements and their respective analog switches; and an amplification circuit for amplifying the potential of the output load components on the side of the photoelectric conversion elements.

According to a preferred embodiment, the image sensor chip comprises a power terminal, a ground terminal, a clock signal input terminal, an analog signal output terminal, photoelectric conversion elements arranged in a row at regular intervals and connected at one end to the power terminal, analog switches connected to the respective output terminals of the photoelectric conversion elements, a switch circuit for sequentially switching on the analog switches in accordance with clock signals, and output load components jointly interposed between the ground terminal and the output terminals of the analog switches, wherein the chip is configured such that the output of the amplification circuit is outputted to the analog signal output terminal.

According to a preferred embodiment, the output load is a load resistor.

According to another preferred embodiment, the output load is a load capacitor.

According to yet another preferred embodiment, the output load consists of a load resistor and a load capacitor connected in parallel to each other.

In the preferred embodiment, the gain-adjusting resistor of the amplification circuit is also fabricated in integral form, and the gain-adjusting resistor comprises a plurality of resistors connected in series and cuttable bypass wirings provided to all or some of the plurality of resistors.

Yet another feature of the preferred embodiment is that the amplification circuit is an operational amplifier; that the gain-adjusting resistor comprises a resistor group interposed between the inverting input and the output of the operational amplifier, and a resistor group interposed between the ground and the inverting input of the operational amplifier; and that each resistor group comprises a plurality of resistors connected in series and cuttable bypass wirings provided to all or some of these resistors.

Thus, the image sensor chip pertaining to the subject invention is fabricated by integrating output load components for photoelectric conversion elements, and an amplification circuit for amplifying a terminal potential of these output load components into a single chip in addition to the basic structure of the image sensor chip comprising a prescribed number of photoelectric conversion elements serving as photoreceptors, analog switches connected in series to the corresponding photoelectric conversion elements, a switch circuit for sequentially switching on the analog switches in accordance with clock signals, and the like. In a preferred embodiment, a resistor for adjusting the gain of the amplification circuit is also integrated into the chip.

In such an image sensor chip, the microcurrent signals outputted as image read signals from the photoelectric conversion elements are outputted (without being allowed to escape from the sensor chips) outside as analog voltage signals obtained by amplifying with an amplification circuit the potential of the output load components on the side of the photoelectric conversion elements. It is therefore possible to markedly reduce or completely prevent the conventionally observed undesirable deterioration in the image read performance due to noise induced by clock signals. As a result, there is no need to provide the substrate for mounting such image sensor chips with amplification circuits or related components, or to form special wiring patterns for noise reduction, making it possible to position the image sensor chips on one side of the substrate and to provide a power source in order to complete the image sensors.

When this is done, a substrate obtained by mounting image sensor chips and light-emitting elements (light sources) on one side in such a manner is attached to the bottom surface of a case, a glass cover is placed on the top surface of the case, and an image sensor is configured such that reflected light from a document on the glass cover illuminated by the light-emitting elements is converged on the photoelectric conversion elements of the image sensor chips, in which case the back surface of the substrate facing the reverse side of this image sensor is free from the irregularities caused by the presence of electronic components, resulting in an improved outward appearance. The thickness dimensions of the image sensor itself can thereby be further reduced, and a narrower space is sufficient for accommodating the image sensor in an instrument designed for use with such image sensors. Collectively, these factors can contribute substantially to reducing the size of an equipment assembly containing such image sensors.

An advantage of using a resistance load as the output load of the amplification circuit is that the desired analog output waveform can be obtained by selecting an appropriate resistance for the load. Specifically, the analog output waveform should resemble a rectangular wave, that is, should have a horizontal or roughly horizontal top portion, to achieve accurate sensing of the output level, and the desirable output waveform can be obtained by appropriately selecting the resistance value of the resistance load.

When a load capacitor is used as the output load of the amplification circuit, correct dark level readings can be obtained because setting the capacitance of this capacitor to an appropriate level allows the electric charge accumulated in the photoelectric conversion elements in accordance with the amount of received light to flow as a burst of current through this load capacitor when the photoelectric conversion elements are selected for reading. Specifically, it is possible to reduce the amount of charge remaining in the photoelectric conversion elements during the outputting of output signals and to suppress the undesirable conditions in which, during the dark-level read cycle in which the photoelectric conversion elements do not receive any light, an output resembling that created by the reception of weak light is generated by the charge remaining in the photoelectric conversion elements from the preceding bright-level read cycle. This means that when a document containing fine horizontal ruled lines on a white background is read, such horizontal ruled lines can be read with sufficient accuracy.

The combined benefits of using a resistance load and a load capacitor can be obtained when these resistance load and load capacitor are connected in parallel with each other as the output load components of the amplification circuit.

In an image sensor chip pertaining to another preferred embodiment, the gain-adjusting resistor for the amplification circuit integrated into the chip comprises, in particular, a plurality of resistors connected in series and cuttable bypass wirings provided to all or some of the plurality of resistors. When an operational amplifier is used as the amplification circuit, this resistor structure can be adopted for the resistors interposed between the ground and the inverting input of the amplifier and/or for the resistors interposed between the inverting input and the output terminal of the operational amplifier. For example, when four resistors of 20 kΩ, 40 kΩ, 80 kΩ, and 160 kΩ, respectively, are connected in series and respective bypass wirings are provided to these resistors to complete a resistor group, the resistance of the entire resistor group can be selected at a level ranging from 0 Ω to 300 kΩ in 20-kΩ increments by selecting, out of the four resistors, the bypass wiring that is to be cut. The cutting of the bypass wirings can be accomplished very easily by laser cutting at the wafer stage, as described below.

In the image sensor chip pertaining to such an embodiment, even the gain of the built-in amplification circuit is preadjusted, making it possible to dispense with the inconvenient procedures performed in the past, such as mounting varistors on the substrate, monitoring the analog output of each substrate under prescribed conditions, and adjusting the varistors to adjust the gain of the amplification circuit. This contributes greatly to simplifying the manufacture of substrates for image sensors.

According to a second aspect of the present invention, a method for manufacturing an image sensor chip pertaining to the first aspect is provided. This manufacturing method is characterized in that the image sensor chip provided by the first aspect is used as a constituent unit, a wafer obtained by integrating a plurality of such units is fabricated, the gain of the amplification circuit is adjusted by cutting with a laser the bypass wirings of resistors selected from a plurality of resistors constituting the gain-adjusting resistor of each chip unit at the wafer stage, and the wafer is divided into image sensor chips by dicing.

Forming a mask on the wafer allows several hundred image sensor chips having the circuit characteristics described with reference to the first aspect to be fabricated as a single lot. These characteristics sometimes vary from wafer to wafer due to minute errors in maskwork conditions. The analog output produced by each chip area under prescribed illumination conditions is checked at the wafer stage. In the meantime, the voltage conditions for analog output are established in accordance with customer requirements and the like. The gain of the amplification circuit needed to obtain the output voltage conditions is set on the basis of the analog output thus checked. Once the gain is thus set, the adjusted value of the gain-adjusting resistor is determined, a decision is made as to which of the plurality of resistors making up the resistor group is to be left in order to achieve such an adjusted value, and the bypass wirings corresponding to these resistors are cut. The bypass wirings can be cut conveniently and rapidly by, for example, scanning an excimer laser beam across the wafer while switching the beam on and off in a controlled manner. An amplification circuit or an image sensor chip having a properly adjusted amplification circuit gain can thus be fabricated.

When an image sensor is configured by mounting a plurality of such image sensor chips, the gain of the amplification circuit is adjusted for each of the image sensor chips and the output level is smoothed, making it possible to adequately prevent the read performance from being adversely affected by the output variations in the main scanning direction due to differences in the output level among the chips.

Other features and advantages of the subject invention will become more apparent from the detailed description given below with reference to drawings.

BEST MODE FOR CARRYING OUT THE INVENTION

Preferred embodiments of the present invention will now be described in detail with reference to drawings.

The overall structure of the image sensor 20 pertaining to the present invention will first be described, primarily with reference to FIGS. 1 and 2.

Figure 1:
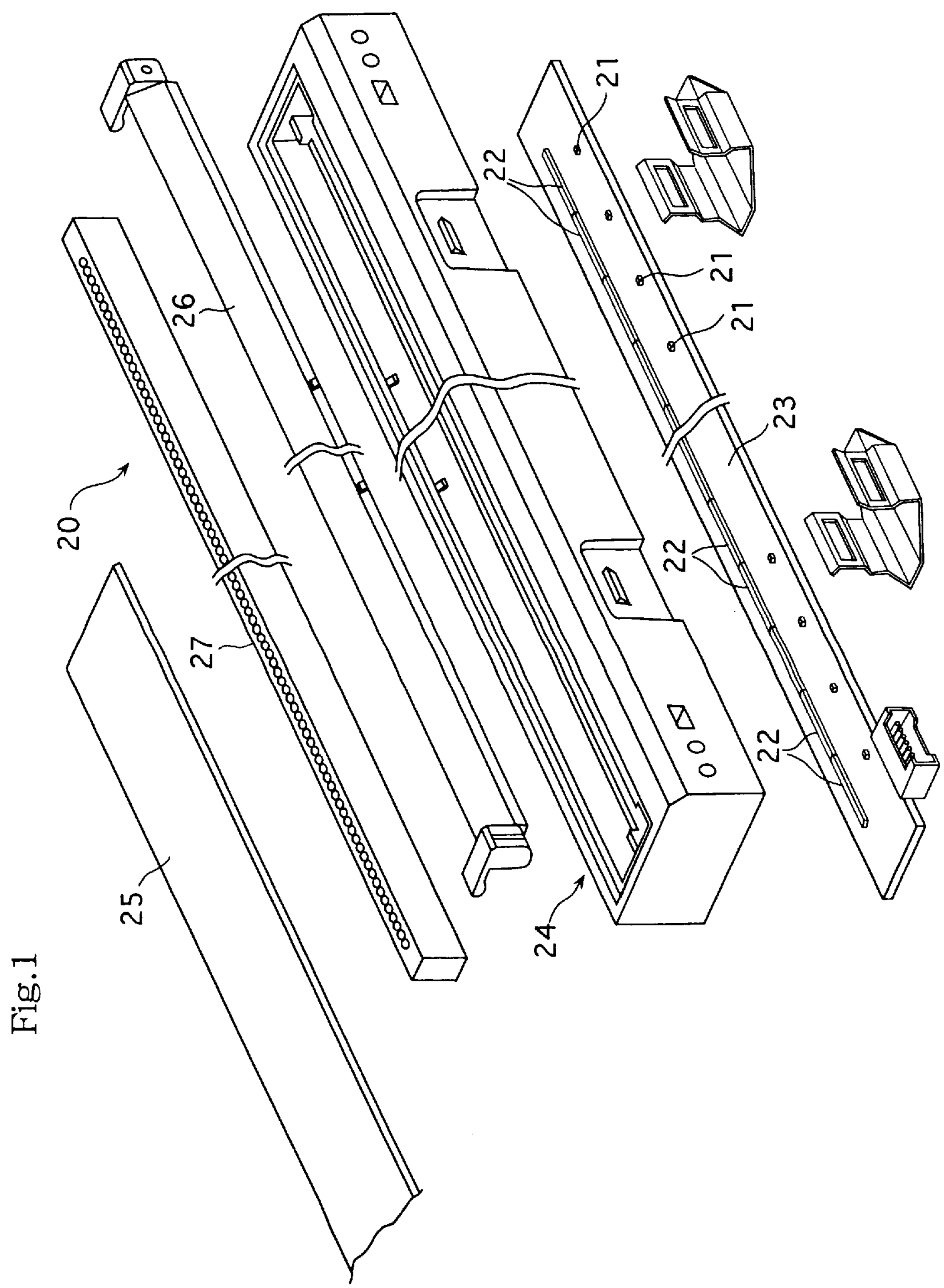
FIG. 1 is a fragmentary perspective view of an embodiment of the image sensor pertaining to the subject invention.
Figure 2:
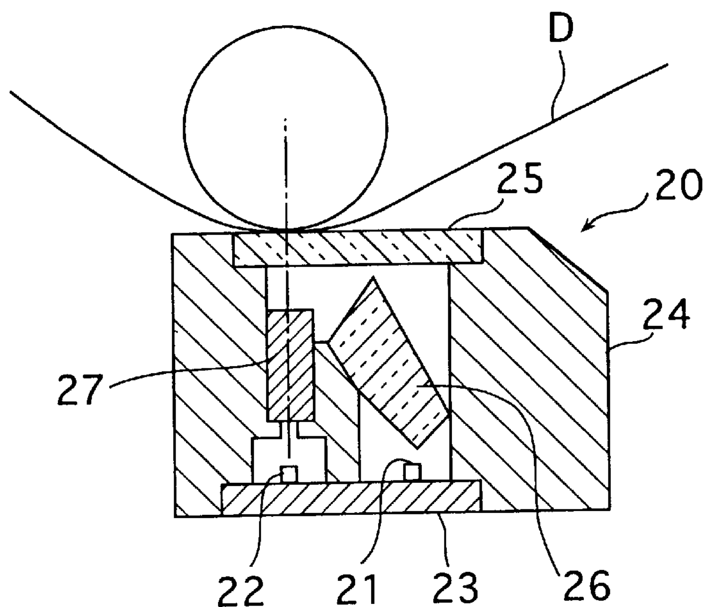
FIG. 2 is a cross-sectional view of the assembled integrated circuit depicted in FIG. 1.

As shown in FIGS. 1 and 2, the image sensor 20 is configured such that a substrate 23 carrying a plurality of LEDs 21 (illumination light sources) and a plurality of image sensor chips 22 (image read elements) is disposed on the bottom of a case 24, a transparent glass cover 25 is placed on the top surface of the case 24, and a light-guide plate 26 for efficiently illuminating the document surface D on the glass cover 25 with the light from the LEDs 21 (light sources) is disposed inside the case 24 together with a rod lens array 27 for converging reflected light from the document surface D on the image sensor chips 22 as a non-inverted image of the same size. For example, 1728 light-receiving elements must be arranged in a row at regular intervals to allow an A4 document to be read at a main scanning density of 8 pixels per millimeter. Such light-receiving elements can be realized by arranging in a row a plurality of image sensor chips 22 each having a plurality of light-receiving elements 28. When, for example, image sensor chips 22 provided with 96 light-receiving elements are used, 18 image sensor chips 22 are mounted in proximity to each other on the substrate 23 in the longitudinal direction such that all the light-receiving elements have a constant pitch.

Figure 3:
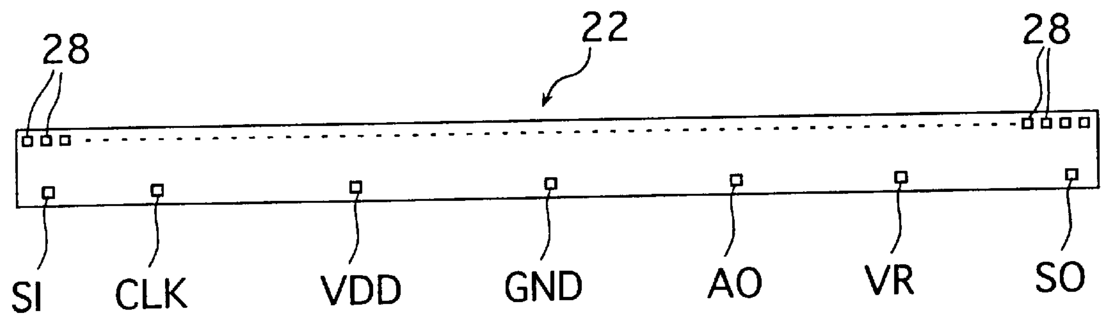
FIG. 3 is an expanded plan view of a first embodiment of the image sensor chip pertaining to the subject invention.

FIG. 3 schematically shows a planar arrangement of each image sensor chip 22. The image sensor chip 22 is obtained by integrating prescribed elements or terminals with a silicon wafer by forming a mask thereon, and dividing the wafer into individual chips by dicing. The light-receiving elements 28 are arranged equidistantly at a pitch of 8 elements per millimeter along one edge of the top surface, and serial-in (SI), clock (CLK), logic power supply (VDD), ground (GND), analog-out (AO), serial-out (SO) and other terminal pads are arranged along the other edge of the top surface. These terminal pads are connected by wire bonding to the prescribed wiring patterns on the substrate 23, on which the image sensor chip 22 is mounted.

Figure 5:
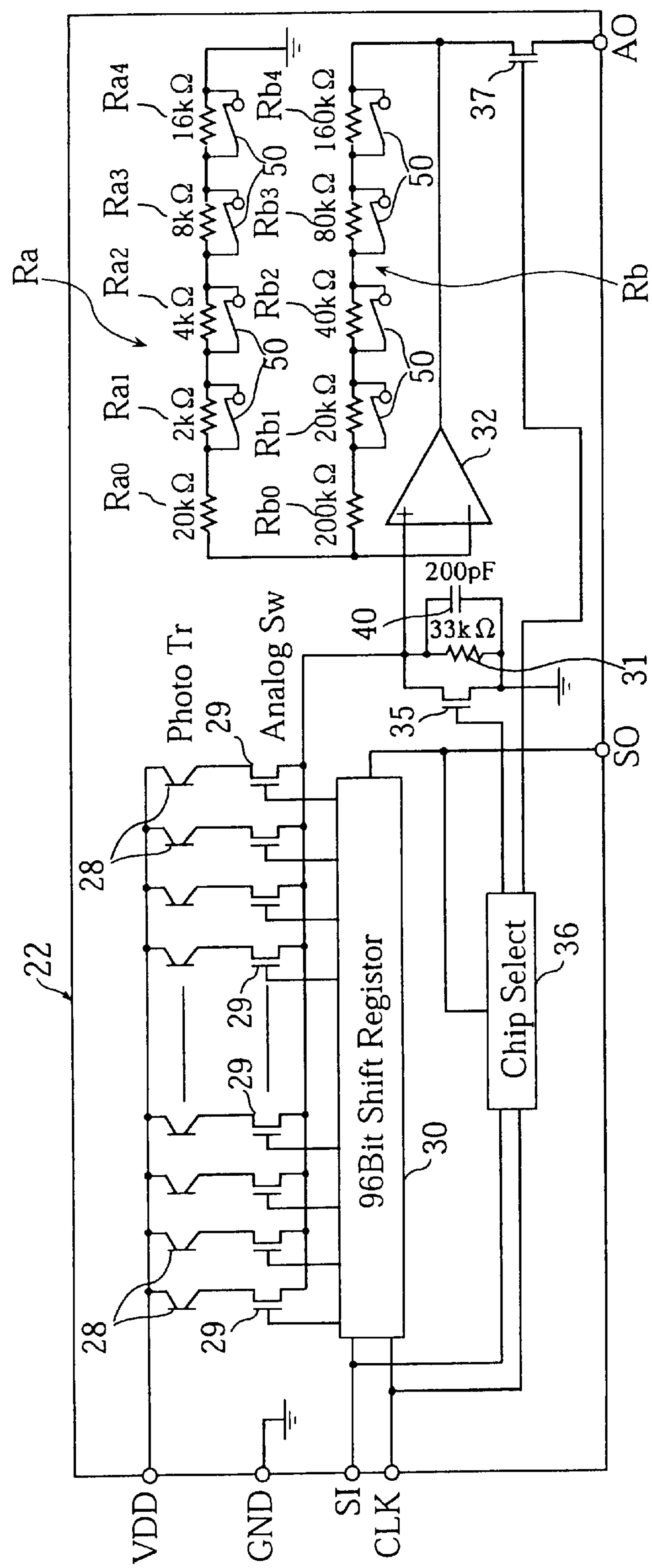
FIG. 5 is an equivalent circuit diagram of the first embodiment of the image sensor chip pertaining to the subject invention.

FIG. 5 depicts an equivalent circuit structure for each image sensor chip 22. A plurality of (for example, 96) photoelectric conversion elements (light-receiving elements) such as phototransistors 28 are jointly connected at their emitters to a logic power supply (VDD). Analog switches 29 are connected in series to the collectors of the corresponding phototransistors 28. These analog switches 29 are sequentially switched on by a switch circuit 30 actuated by clock signals when this image sensor chip 22 has been selected. A shift register is suitable for use as such a switch circuit. Serial-in (SI) signals and clock (CLK) signals are therefore inputted to this shift register 30.

A resistance load 31 of prescribed resistance is jointly connected in series between the ground (GND) terminals and the output terminals of the analog switches 29. A load capacitor 40 is interposed in parallel to the resistance load 31. In this embodiment, the resistance load 31 and load capacitor 40 cooperate to constitute an output load for the phototransistors 28. Specifically, the terminal sections of these resistance load 31 and load capacitor 40 on the side of the photoelectric conversion elements are connected to the noninverting input of an operational amplifier 32 (amplification circuit). A gain-adjusting resistor R comprising a resistor group Ra and a resistor group Rb is connected to the inverting input of the operational amplifier 32 such that the group Ra is interposed between the inverting input and the ground, and the group Rb is interposed between the inverting input and the output terminal of the operational amplifier 32. As is known, the gain G of the operational amplifier 32 is expressed as G=1+(Rb/Ra) In more specific terms, the gain-adjusting resistor R is configured in the following manner. Specifically, the resistor group Ra is configured such that four adjusting resistors $Ra_1$, $Ra_2$, $Ra_3$ and $Ra_4$ of 2 kΩ, 4 kΩ, 8 kΩ, and 16 kΩ, respectively, are connected in series to a 20-kΩ reference resistor $Ra_0$, and each adjusting resistor is provided with a respective bypass wiring 50 in a parallel arrangement. In addition, the resistor group Rb is configured such that four adjusting resistors $Rb_1$, $Rb_2$, $Rb_3$ and $Rb_4$ of 20 kΩ, 40 kΩ, 80 kΩ, and 160 kΩ, respectively, are connected in series to a 200-kΩ reference resistor $Rb_0$, and each adjusting resistor is provided with a respective bypass wiring 50 in a parallel arrangement. The bypass wirings 50 are fine aluminum wirings formed on a silicon wafer. The resistor group Ra is such that only the reference resistor Ra0 is active when all the bypass wirings 50 are connected, and the total resistance of this resistor group Ra is therefore 20 kΩ. Similarly, the total resistance of the resistor group Rb is 200 kΩ when all the bypass wirings 50 are connected. The gain G of the operational amplifier 32 in this state is therefore G=1+(200/20)=11.

The total resistance of the resistor group Rb should be increased in order to raise the gain G. The total resistance of the resistor group Ra should be increased in order to lower the gain G. To increase the total resistance of the resistor group Ra or Rb, a decision is made as to which of the serially connected adjusting resistors $Ra_1$, $Ra_2$, $Ra_3$, $Ra_4$, $Rb_1$, $Rb_2$, $Rb_3$, and $Rb_4$ constituting these groups should be activated, and the bypass wiring 50 of the selected resistor is cut. In the embodiment illustrated, the resistor group Ra comprises, for example, four adjusting resistors $Ra_1$, $Ra_2$, $Ra_3$, and $Ra_4$ of 2 kΩ, $2^2$ kΩ, $2^3$ kΩ, and $2^4$ kΩ, making it possible to select a resistance ranging from 20 kΩ to 50 kΩ in 2-kΩ increments by selecting any of the adjusting resistors. Similarly, the resistor group Rb makes it possible to select a resistance ranging from 200 kΩ to 500 kΩ in 20-kΩ increments. Gain is adjusted using a procedure in which analog output is checked for each chip area under prescribed illumination conditions before the wafer has been divided into individual chips by dicing, the gain needed for the amplifier 32 to yield the analog output level required by the customer or the like is calculated for the analog output available at this stage, and the bypass wiring 50 of the selected adjusting resistor is cut by laser cutting in order to establish the desired total resistance of the resistor group Ra and resistor group Rb. Such laser cutting may, for example, be readily accomplished by scanning an excimer laser beam across the wafer while switching the beam on and off in a controlled manner.

Meanwhile, an analog switch 35 is interposed in parallel with an output load comprising the resistance load 31 and load capacitor 40, and this analog switch 35 is switched on and off by signals from a chip selection circuit 36. In addition, an analog switch 37 is interposed between the output terminal of the operational amplifier 32 and an analog-out (AO) terminal, and this analog switch 37 is switched on and off by signals from the chip selection circuit 36. One end of the shift register 30 is connected to a serial-out (SO) terminal and to the chip selection circuit 36, and serial-in (SI) signals and clock (CLK) signals are inputted to the chip selection circuit 36.

The chip selection circuit 36 keeps the analog switch 37 on from the moment a pulse signal is inputted to the serial-in (SI) until the moment a pulse signal is outputted from the output of the shift register 30, and keeps the analog switch 35 off during each fall period of the clock pulse.

Figure 4:
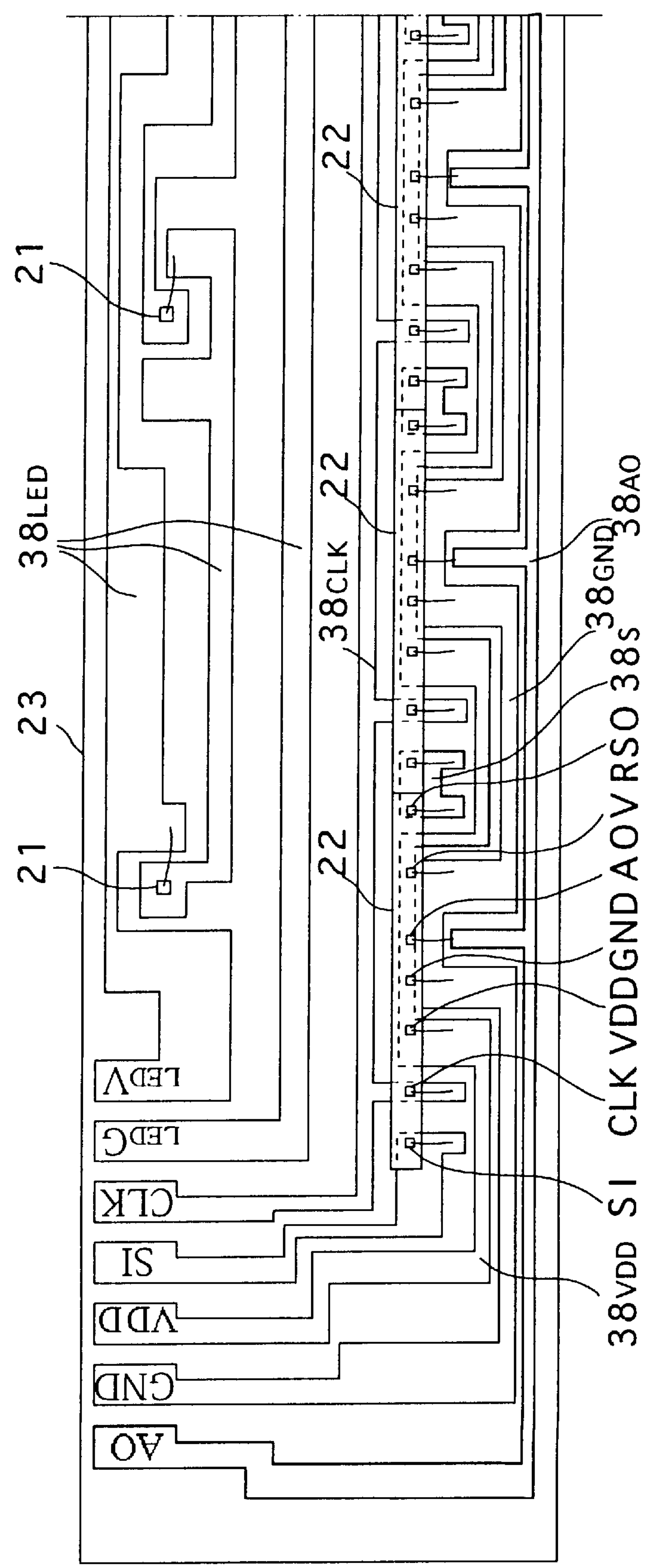
FIG. 4 is a fragmentary expanded plan view of a substrate for the image sensor pertaining to the subject invention.

The image sensor chip 22 thus formed is bonded to the substrate 23 in the following manner. Specifically, as shown in FIG. 4, the logic power (VDD) terminal of each image sensor chip 22 is jointly connected by wire bonding to a logic power wiring pattern $\mathbf{38}_{VDD}$ on the substrate 23, the ground (GND) terminal to the a ground wiring pattern $\mathbf{38}_{GND}$ on the substrate, the clock signal (CLK) terminal to a clock signal wiring pattern $\mathbf{38}_{CLK}$ on the substrate, and the analog-out (AO) terminal to an analog-out wiring pattern $\mathbf{38}_{AO}$ on the substrate. These terminals are also connected in cascade between the serial-out (SO) terminals and the serial-in (SI) terminals of adjacent image sensor chips via a wiring pattern $\mathbf{38}_{S}$ on the substrate.

The substrate 23 is also provided with wiring patterns $\mathbf{38}_{LED}$ for installing a plurality of LED chips 21 as illumination light sources, and these wiring patterns are used to arrange the plurality of LED chips 21 at regular intervals.

The substrate 23 may, for example, be obtained by forming the wiring patterns on a substrate material composed of an alumina ceramic. The wiring patterns can, for example, be appropriately formed by screen printing using gold paste. Each wiring pattern is concentrated in a predetermined position on the substrate 23 and is prepared for outside connection by being provided with appropriate connectors or the like.

The operation of the image sensor 20 will subsequently be described, with emphasis on the operation of the image sensor chips 22.

The contrast image of a document D on a read line L marked on the glass cover 25 is converged on 1728 light-receiving elements 28. Specifically, light whose intensity corresponds to the contrast image on the read line L strikes the 1728 light-receiving elements arranged in a row.

Figure 6:
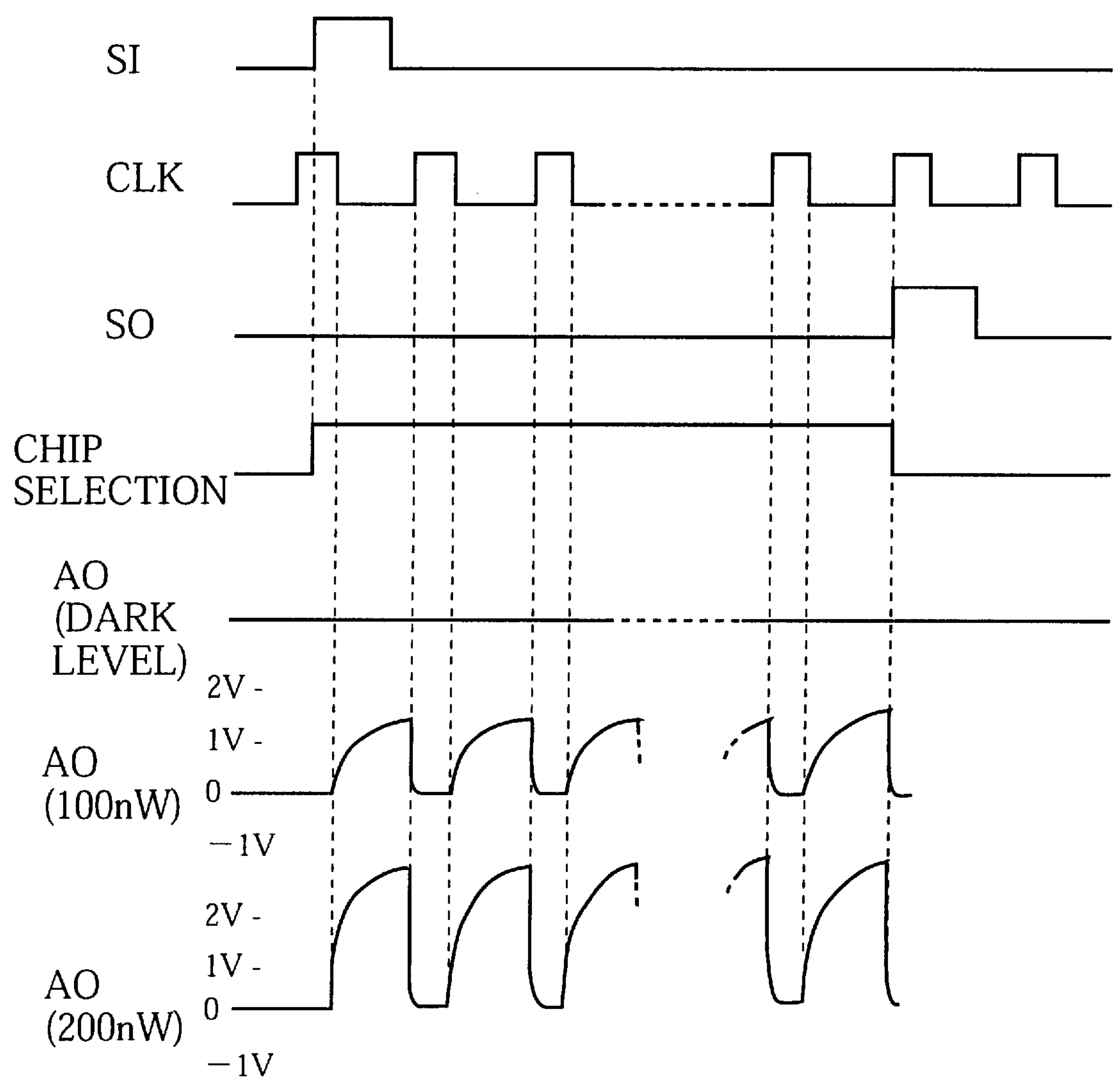
FIG. 6 is a dynamic chart illustrating the operation of an image sensor chip having the circuit structure shown in FIG. 5.

As indicated by the timing chart in FIG. 6, the chip selection circuit 36 switches on the analog switch 37 at the analog-out (AO) terminal when a pulse signal has been inputted to this chip from the serial-in (SI) terminal, and this state is maintained until a pulse signal is outputted (SO) from the shift register 30. Specifically, image read data are serially outputted from the analog-out (AO) terminal while the analog switch 37 is on.

Pulse signals inputted at one end of the shift register 30 are sequentially shifted by clock pulses, and this is accompanied by the sequential energizing of the analog switches 29 connected in series to the phototransistors 28. Phototransistors 28 for outputting read signals are thus sequentially selected. Meanwhile, the chip selection circuit 36 switches on the analog switch 35 during each rise cycle of the clock pulses, and switches off the analog switch 35 during the fall cycles of the clock pulses, with the result that, as indicated by the timing chart in FIG. 6, an electric charge proportional to the intensity of light received by the sequentially selected phototransistors 28 flows through the output load composed of the resistance load 31 and load capacitor 40 during the fall cycles of the clock pulses and the prescribed read cycles of the phototransistors. The corresponding microcurrent signals are sensed as the potential of the output loads 31 and 40 on the phototransistor side, this potential is converted to a voltage waveform and amplified in accordance with a prescribed gain by the operational amplifier 32, and the analog data converted to such a voltage waveform are outputted from the analog-out (AO) terminal. The pulse signals outputted by the shift register 30 are transmitted from the serial-out (SO) terminal via the pattern on the substrate to the adjacent chip, and the signals sensed by the phototransistors on the adjacent chip are read as serial data in the same manner as above.

Figure 11:
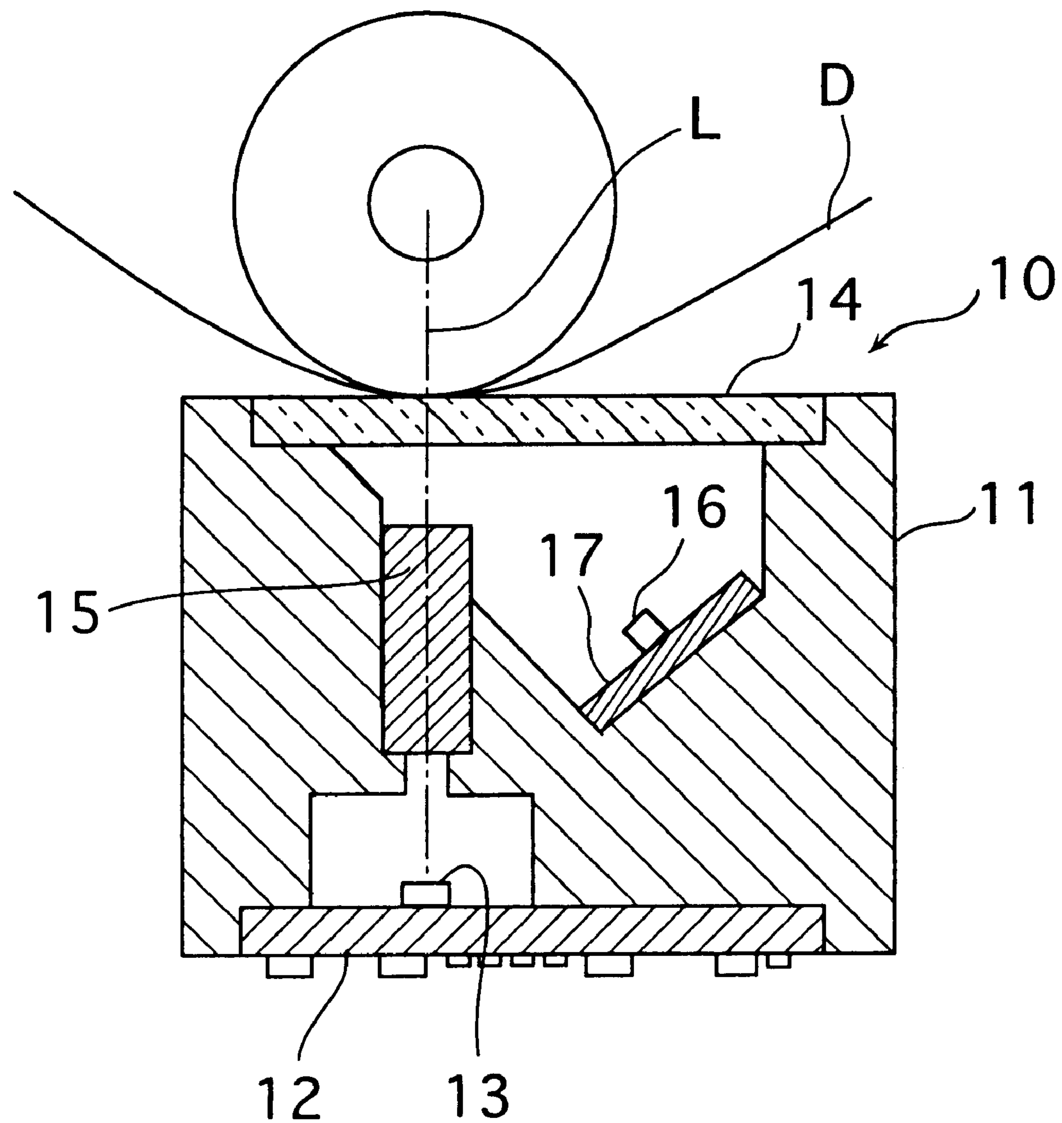
FIG. 11 is a cross-sectional view of an image sensor pertaining to a conventional example.
Figure 12:
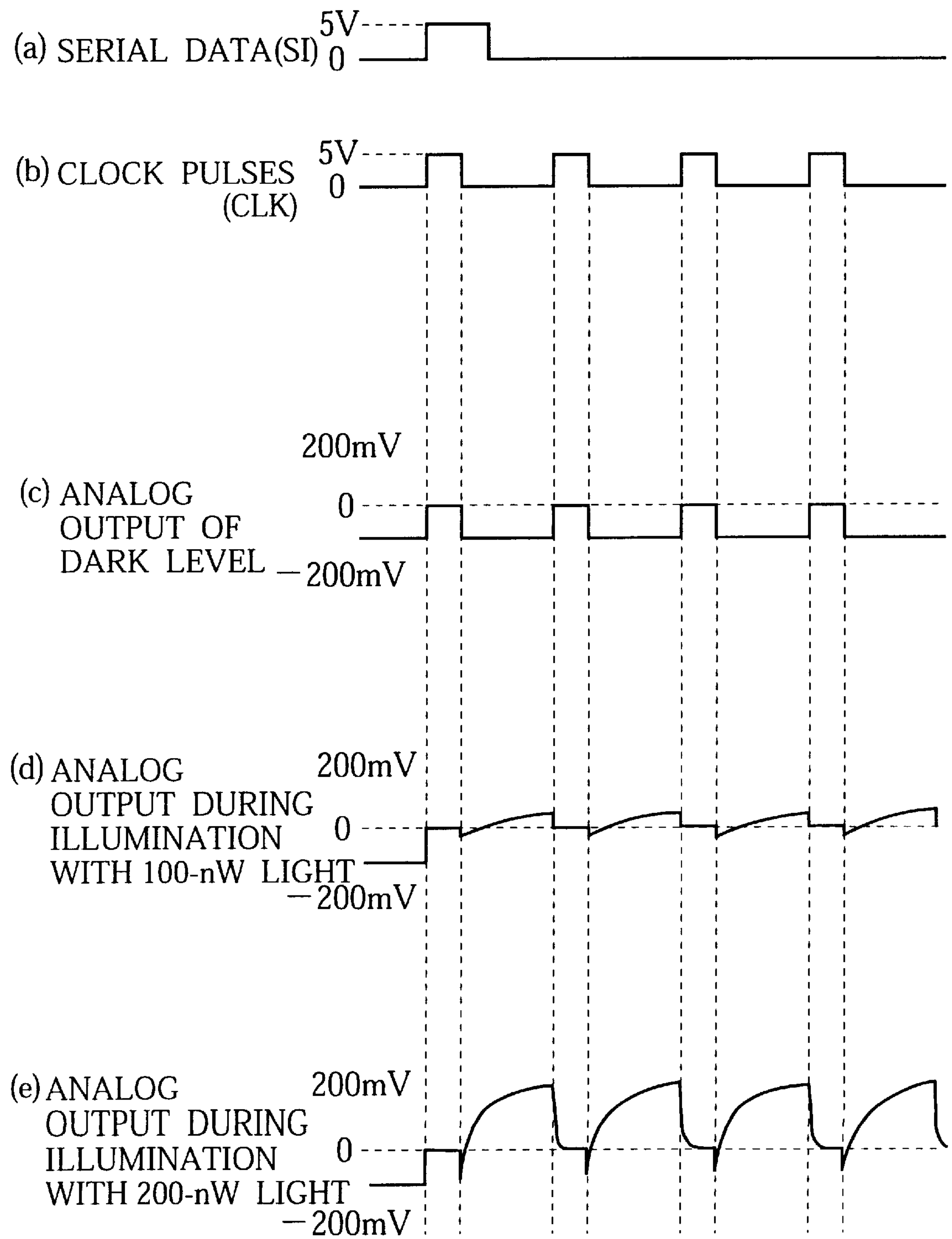
FIG. 12 is a dynamic chart illustrating the operation of the conventional example.

FIG. 6 also depicts the output waveform of the image sensor chip 22 pertaining to the above-described embodiment for a variable intensity of illuminating light. It is evident from the drawing that at the dark level (when there is no illumination with light), clock pulses are not superposed as alternating-current components on the output waveform the way they are superposed in the conventional examples depicted in FIGS. 11 and 12. The reason for this is that because the image sensor chip 22 is such that the amplifier circuit 32 and the output loads 31 and 40 are integrated into the image sensor chip 22, a high-impedance output that tends to pick up noise is not brought out to the substrate the way it is brought out in the conventional examples. Consequently, the output waveform exactly matches the intensity of light received by each phototransistor, and, as a result, the image read performance of this image sensor chip is dramatically improved.

It should be noted that the embodiment described above involves an arrangement in which a resistance load 31 and a load capacitor 40 cooperate as loads for the phototransistors 28 (light-receiving elements). As described above, the phototransistors 28 output an electric current proportional to the amount of light received during the read cycle in the period during which the analog switch 35 is on. Because of the special properties of the capacitor operating as an output load, the charges that have been retained by the phototransistors 28 immediately flow to this capacitor at this time, making it possible to reduce the amount of charge remaining, in particular, on the bases of the phototransistors 28 when the off-cycle of the analog switch 35 has ended.

Figure 7:
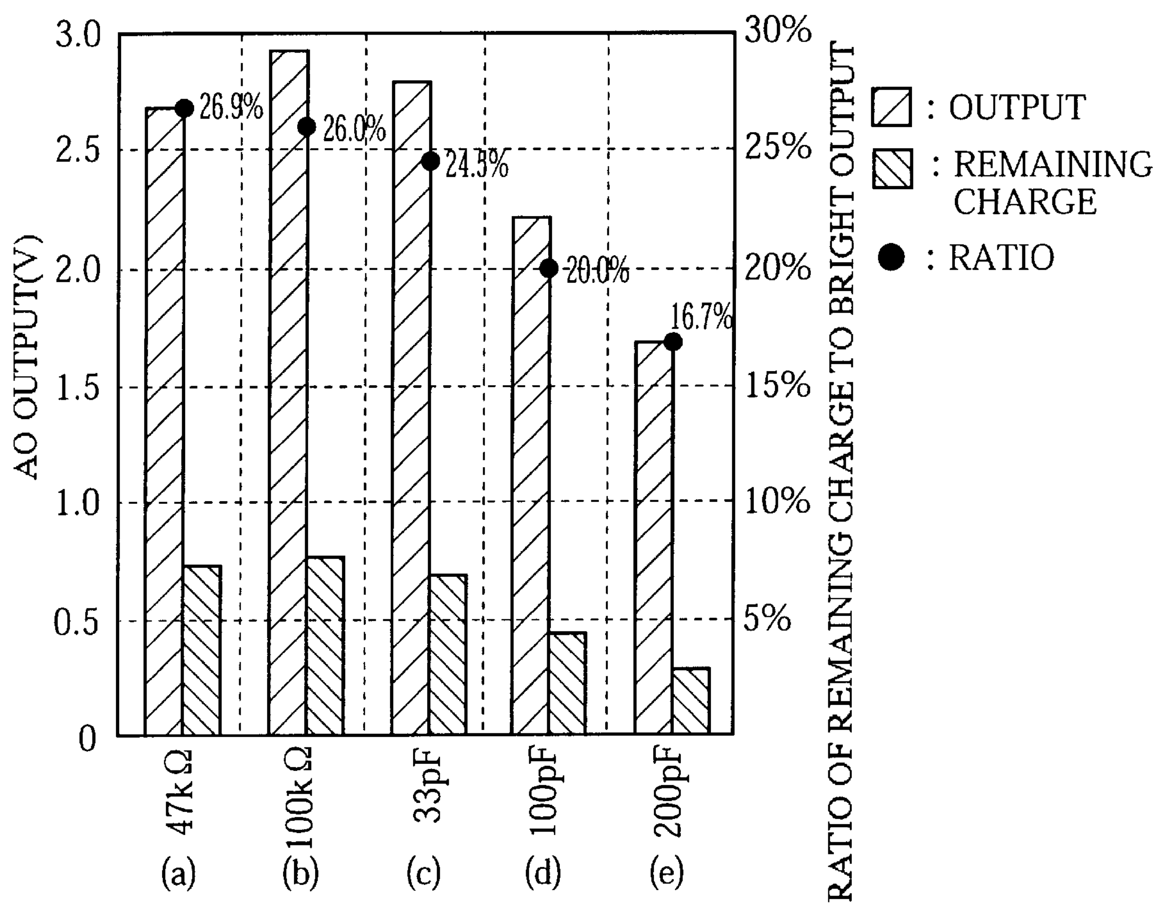
FIG. 7 is a graph illustrating the operation of an image sensor chip having the circuit structure shown in FIG. 5.

FIG. 7 depicts, in summary form, experimental results obtained when various levels are selected as output loads for the phototransistors 28 to obtain an analog output by separating a document D into "white" section and "black" sections and reading the black sections after reading the white sections. Specifically, the outputs of "white" and "black" readouts are quantitatively shown in FIG. 7, where FIG. 7*a* pertains to a case in which a resistance of 47 kΩ is established as the output load, FIG. 7*b* pertains to a case in which a resistance of 10 kΩ is established as the output load, FIG. 7*c* pertains to a case in which a capacitor having a capacitance of 33 pF is provided as the output load, FIG. 7*d* pertains to a case in which a capacitor having a capacitance of 100 pF is provided as the output load, and FIG. 7*e* pertains to a case in which a capacitor having a capacitance of 200 pF is provided as the output load. The corresponding power voltage is 5 V, the luminous energy of the illumination light source 0.796 μW, the read cycle 5 ms, and the gain of the operational amplifier 10. It can be seen in the drawings that a certain level of output exists even for a black readout, which, ideally, is supposed to produce zero output level. This is the result of a process in which the charge accumulated in the phototransistors during a white readout, and particularly the charge remaining in the bases, is outputted during a black readout. Specifically, the analog output of a black readout corresponds to the amount of charge remaining during the immediately preceding white readout.

It is evident in FIG. 7 that when a resistor is provided as an output load, the ratio of remaining charge to white readout output exceeds 26%, but when a capacitor is provided as the output load, the ratio can reduced to as low as about 16% by establishing an appropriate capacitance. The accuracy with which fine horizontal ruled lines are read improves with a reduction in the ratio of remaining charge, allowing the image sensor chip pertaining to this embodiment to deliver an improved performance in terms of reading horizontal ruled lines as well.

Figure 8:
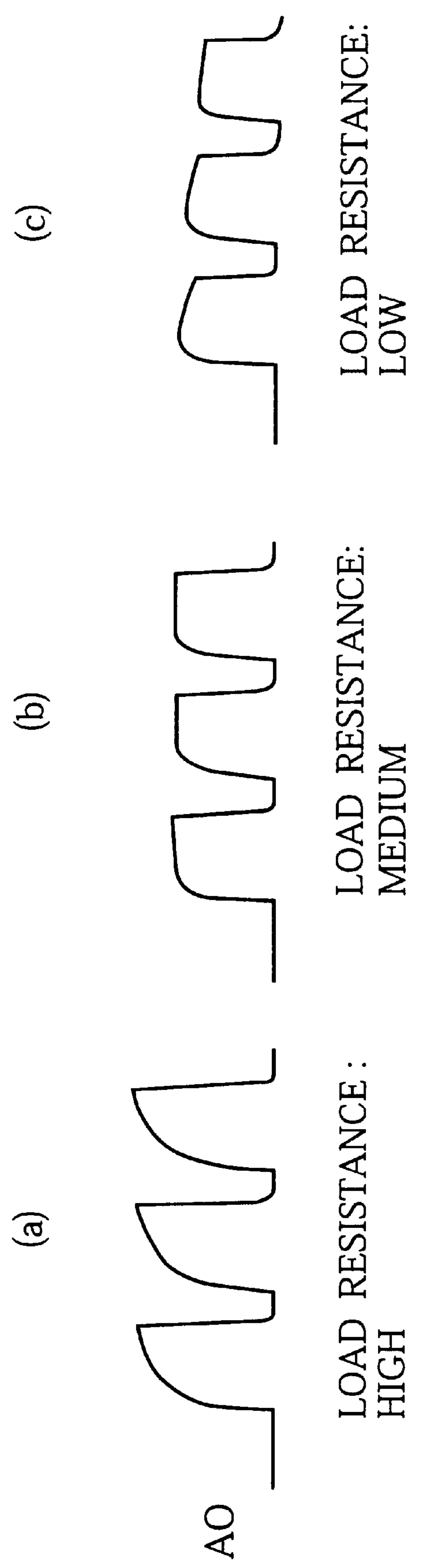
FIG. 8 is an output waveform diagram illustrating the operation of an image sensor chip having the circuit structure shown in FIG. 5.

As is also shown in FIG. 8, the bright output waveform outputted from the analog-out (AO) terminal can be varied by including the resistance load 31 into the output load in such a manner and selecting appropriate resistance for this resistance load. Specifically, a comparatively large resistance load results in an output waveform that rises on the right and has a sawtooth shape (as shown in FIG. 8*a*), but the trailing end of the top portion of the waveform tends to decrease with a reduction in the resistance load. The bright output waveform should be as close to a rectangular wave as possible and have a horizontal or roughly horizontal top portion (as shown in FIG. 8*b*) to achieve optimum processing of image read data. Such a waveform can be obtained by properly selecting the resistance of the resistance load.

Thus, as described above, the subject invention is such that the output from the image sensor chip represents a voltage waveform that is free from noise and is already amplified to the desired gain level, dispensing with the need to adopt noise-suppressing actions for the substrate or to mount amplifier circuits, adjusting varistors, or other electronic components on the substrate. It is thus possible to use products obtained by forming wiring patterns on one side. Such substrates can be fabricated by performing the simple step of forming wiring patterns on alumina ceramic substrates by means of screen printing. Such fabrication can be further facilitated because the wiring patterns may be formed on only one side. In addition, the output level of each image sensor chip can be adjusted individually, making it possible to prevent read characteristics from being adversely affected by variations in the read level of each chip at different locations in the main scanning direction.

Thus, as shown in FIG. 1 or 2, the proposed image sensor chip 22 or image sensor 20, which is obtained by adopting a substrate 23 on which the image sensor chips and LED chips (light sources) are mounted on one side in the manner described above, is devoid of the irregularities created by mounting outside components on the back side, has an excellent appearance, is very easy to handle, and is made smaller in the thickness direction.

It is apparent that the scope of this invention is not limited to the embodiment described above. The analog switches connected in series to the photoelectric conversion elements may also be connected to the terminals of the photoelectric conversion elements on the power supply side. In addition, the load capacitor 40 and the resistance load 31, other than being jointly connected to the photoelectric conversion elements on the ground side (as in the embodiment), may also be jointly connected on the power supply side, and the potential difference between their terminals may be amplified by an amplifier circuit.

Figure 9:
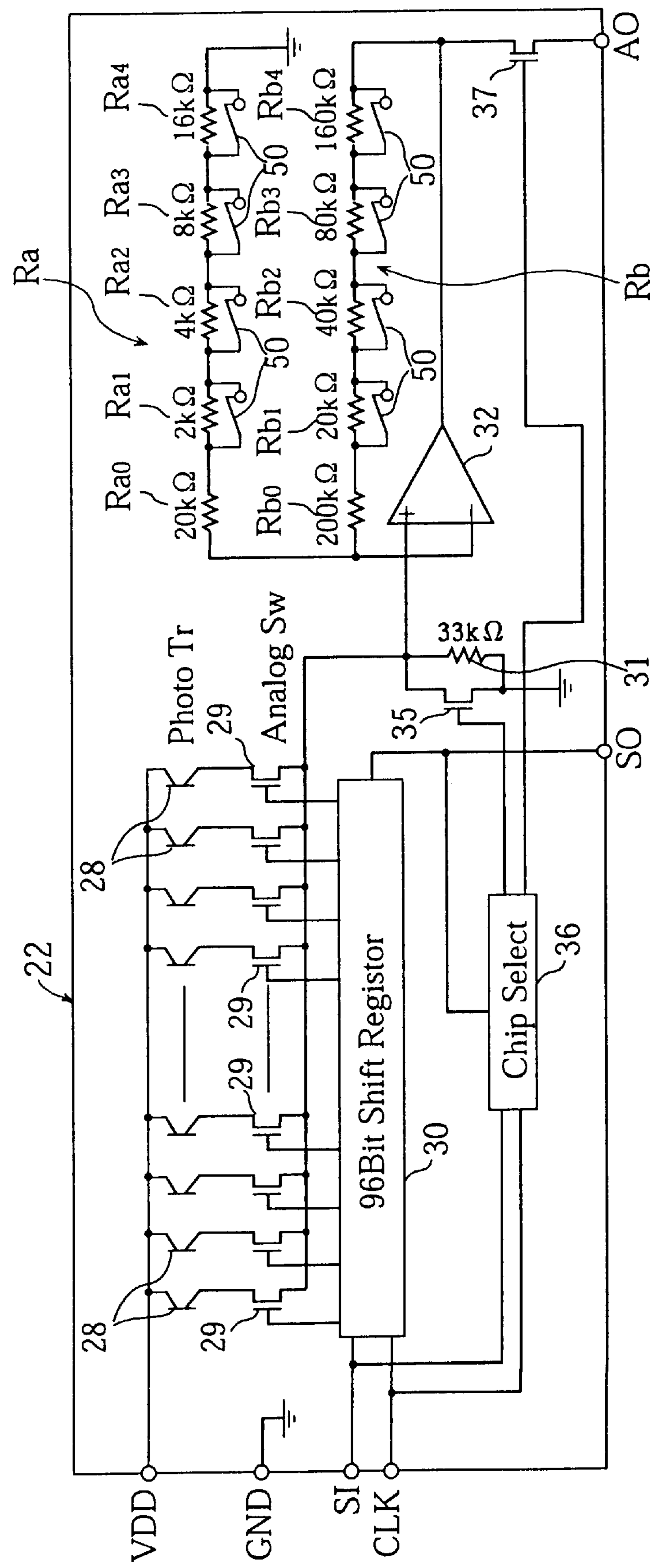
FIG. 9 is an equivalent circuit diagram of another embodiment of the image sensor chip pertaining to the subject invention.
Figure 10:
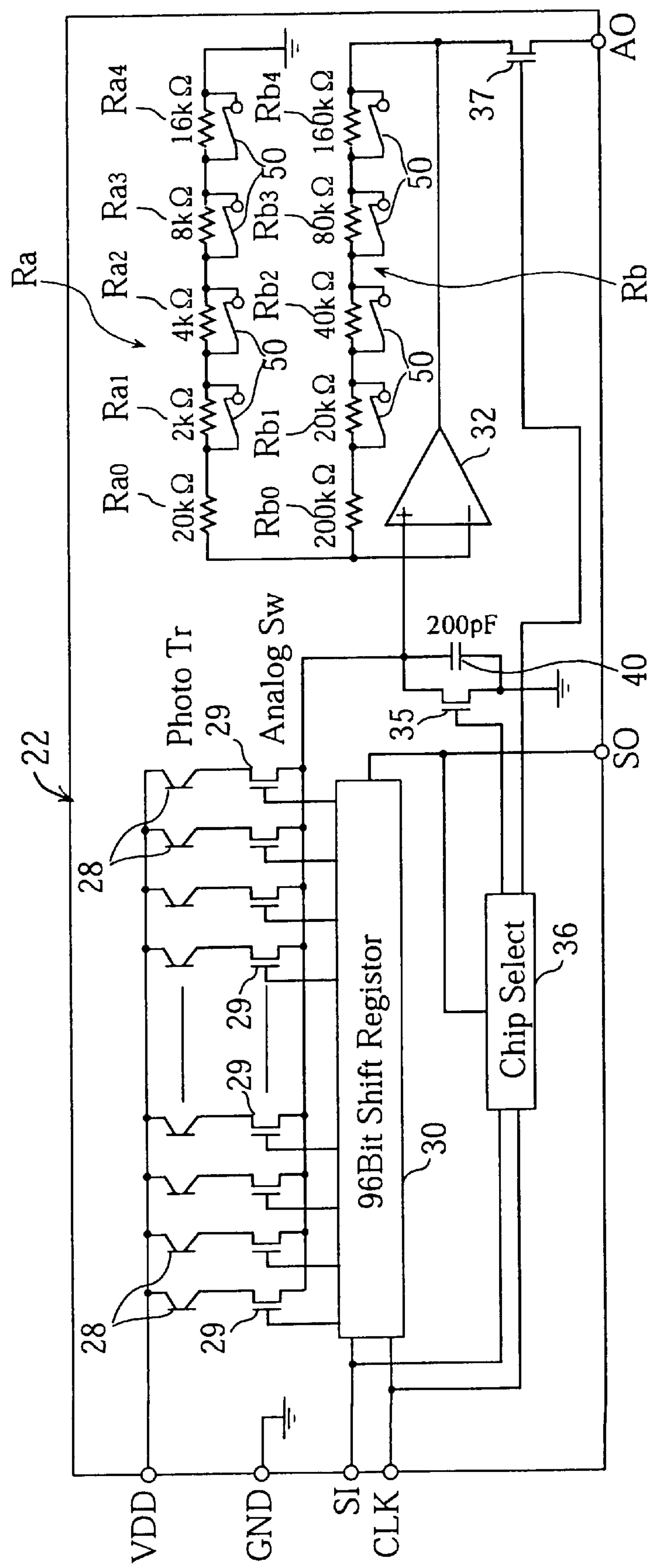
FIG. 10 is an equivalent circuit diagram of yet another embodiment of the image sensor chip pertaining to the subject invention.

Although a resistance load 31 and a load capacitor 40 connected in parallel were used as the output load components of the phototransistors in the embodiment described above, it is also possible to use a load consisting solely of the resistance load 31 (as shown in FIG. 9) or load capacitor 40 (as shown in FIG. 10).

Industrial Applicability

The image sensor chip of the claimed invention is suitable for use as an element constituting the image sensor of a fax machine, image scanner, or other image reader.

What is claimed is:

1. An image sensor chip integrally comprising: a prescribed number of photoelectric conversion elements; analog switches connected in series to the respective photoelectric conversion elements; a switch circuit for sequentially switching on said analog switches in accordance with clock signals; an output load commonly connected in series to a respective set of each photoelectric conversion element and a corresponding analog switch; and an amplification circuit for amplifying a potential of said output load on the side of the photoelectric conversion elements;

wherein said output load comprises a load resistor and a load capacitor connected in parallel to each other.

2. The image sensor chip according to claim 1, further integrally comprising a power terminal, a ground terminal, a clock signal input terminal, and an analog signal output terminal, said photoelectric conversion elements being arranged in a row at regular intervals and connected at one end to said power terminal, said analog switches being connected to respective output terminals of said photoelectric conversion elements, said output load being jointly interposed between said ground terminal and an output terminal of each analog switch; an output of said amplification circuit being supplied to said analog signal output terminal.

3. The image sensor chip according to claim 1, wherein said amplification circuit comprises a gain-adjusting resistor unit formed integrally in the image sensor chip, said gain-adjusting resistor unit including a plurality of resistors connected in series and a cuttable bypass wiring provided for at least one of said plurality of resistors.

4. The image sensor chip according to claim 3, wherein said amplification circuit comprises an operational amplifier; said gain-adjusting resistor including a resistor group interposed between an inverting input of said operational amplifier and an output of the same operational amplifier, and another resistor group interposed between said ground terminal and the inverting input of said operational amplifier; each resistor group including a plurality of resistors connected in series and a cuttable bypass wiring provided for at least one of these resistors.

5. An image sensor chip integrally comprising: a prescribed number of photoelectric conversion elements; analog switches connected in series to the respective photoelectric conversion elements; a switch circuit for sequentially switching on said analog switches in accordance with clock signals; an output load commonly connected in series to a respective set of each photoelectric conversion element and a corresponding analog switch; and an amplification circuit for amplifying a potential of said output load on the side of the photoelectric conversion elements; said amplification circuit including a gain-adjusting resistor unit;

wherein wherein said amplification circuit comprises an operational amplifier; said gain-adjusting resistor including a resistor group interposed between an inverting input of said operational amplifier and an output of the same operational amplifier, and another resistor group interposed between said ground terminal and the inverting input of said operational amplifier; each resistor group including a plurality of resistors connected in series and a cuttable bypass wiring provided for at least one of these resistors.

6. The image sensor chip according to claim 5, wherein said output load comprises a load resistor and a load capacitor connected in parallel to each other.

7. An image sensor substrate comprising, as mounted on a surface thereof, a plurality of image sensor chips together with at least one light-emitting element, each of the image sensor chips having the structure as defined in claim 1.

8. An image sensor comprising: a case having a bottom provided with an image sensor substrate as defined in claim 7, a glass cover placed on top of the case, reflected light from a document on the glass cover illuminated by the light-emitting elements is converged on the photoelectric conversion elements of said image sensor chips.

9. An image sensor substrate comprising, as mounted on a surface thereof, a plurality of image sensor chips together with at least one light-emitting element, each of the image sensor chips having the structure as defined in claim 5.

* * * * *